US008886701B1

(12) United States Patent
Subbiah

(10) Patent No.: US 8,886,701 B1
(45) Date of Patent: Nov. 11, 2014

(54) NETWORK BASED SOFTWARE AGENT TO ALLOW DYNAMIC RESOURCE ACCESS

(75) Inventor: Barani Subbiah, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1979 days.

(21) Appl. No.: 10/195,877

(22) Filed: Jul. 15, 2002

(51) Int. Cl.
*G06F 15/16* (2006.01)
*G06F 15/173* (2006.01)

(52) U.S. Cl.
USPC ........... 709/202; 709/203; 709/217; 709/223; 709/227

(58) Field of Classification Search
USPC ................. 709/202–203, 217–223, 225–226, 709/227–230
See application file for complete search history.

(56) References Cited

U.S. PATENT DOCUMENTS

| | | | |
|---|---|---|---|
| 5,283,887 A | 2/1994 | Zachery | |
| 5,406,557 A | 4/1995 | Baudoin | |
| 5,418,908 A | 5/1995 | Keller et al. | |
| 5,436,960 A | 7/1995 | Campana, Jr. et al. | |
| 5,781,901 A | 7/1998 | Kuzma | |
| 5,838,252 A | 11/1998 | Kikinis | |
| 5,844,969 A | 12/1998 | Goldman et al. | |
| 5,903,723 A | 5/1999 | Beck et al. | |
| 5,905,777 A | 5/1999 | Foladare et al. | |
| 5,937,162 A | 8/1999 | Funk et al. | |
| 5,958,006 A | 9/1999 | Eggleston et al. | |
| 5,964,833 A | 10/1999 | Kikinis | |
| 5,974,449 A | 10/1999 | Chang et al. | |
| 5,978,837 A | 11/1999 | Foladare et al. | |
| 5,995,597 A | 11/1999 | Woltz et al. | |
| 6,023,700 A | 2/2000 | Owens et al. | |
| 6,035,104 A | 3/2000 | Zahariev | |
| 6,073,165 A | 6/2000 | Narasimhan et al. | |
| 6,144,997 A * | 11/2000 | Lamming et al. | ............. 709/217 |
| 6,160,631 A | 12/2000 | Okimoto et al. | |
| 6,182,059 B1 | 1/2001 | Angotti et al. | |
| 6,195,677 B1 * | 2/2001 | Utsumi | ......................... 709/201 |
| 6,201,611 B1 * | 3/2001 | Carter et al. | ................. 358/1.15 |
| 6,219,694 B1 | 4/2001 | Lazaridis et al. | |
| 6,230,200 B1 * | 5/2001 | Forecast et al. | ............... 709/226 |
| 6,256,666 B1 | 7/2001 | Singhal | |
| 6,275,848 B1 | 8/2001 | Arnold | |

(Continued)

FOREIGN PATENT DOCUMENTS

| | | | |
|---|---|---|---|
| EP | 0772327 A2 | 5/1997 | |
| EP | 0855821 A1 | 7/1998 | |

(Continued)

OTHER PUBLICATIONS

Behnam Mehmanpazir, United States Patent Application entitled "Method and System for Printing From An IP Network," U.S. Appl. No. 09/697,990, filed Oct. 27, 2000.

(Continued)

*Primary Examiner* — Minh-Chau Nguyen

(57) ABSTRACT

A method of enabling a client connected to a foreign computer network to utilize various network resources within the foreign computer network. Wherein, the client may not possess the various applications and drivers typically needed to operate the network resources. For example, a personal digital assistant (PDA) could wirelessly connect to an Ethernet network and print a document located on the internet without downloading the specific printer driver or the application with which to open the document.

10 Claims, 5 Drawing Sheets

(56) References Cited

U.S. PATENT DOCUMENTS

| | | | |
|---|---|---|---|
| 6,360,252 B1 | 3/2002 | Rudy et al. | |
| 6,453,129 B1 | 9/2002 | Simpson et al. | |
| 6,515,988 B1 * | 2/2003 | Eldridge et al. | 370/389 |
| 6,522,421 B2 | 2/2003 | Chapman et al. | |
| 6,604,140 B1 * | 8/2003 | Beck et al. | 709/226 |
| 6,629,481 B1 * | 10/2003 | Biro et al. | 83/477.2 |
| 6,665,712 B2 * | 12/2003 | Pickup | 709/219 |
| 6,694,354 B1 * | 2/2004 | Elg | 709/217 |
| 6,701,361 B1 * | 3/2004 | Meier | 709/224 |
| 6,732,176 B1 * | 5/2004 | Stewart et al. | 709/227 |
| 6,738,841 B1 * | 5/2004 | Wolff | 710/62 |
| 6,744,528 B2 * | 6/2004 | Picoult et al. | 358/1.15 |
| 6,799,208 B1 * | 9/2004 | Sankaranarayan et al. | 709/223 |
| 6,867,874 B1 | 3/2005 | Shima | |
| 6,892,251 B2 | 5/2005 | Anderson et al. | |
| 6,901,446 B2 * | 5/2005 | Chellis et al. | 709/226 |
| 6,909,518 B2 | 6/2005 | Miller et al. | |
| 6,922,725 B2 * | 7/2005 | Lamming et al. | 709/227 |
| 6,928,462 B2 | 8/2005 | Jia | |
| 6,941,356 B2 * | 9/2005 | Meyerson | 709/220 |
| 6,944,868 B2 | 9/2005 | Simpson et al. | |
| 6,961,762 B1 * | 11/2005 | Yeap et al. | 709/221 |
| 6,970,927 B1 * | 11/2005 | Stewart et al. | 709/225 |
| 6,975,419 B2 | 12/2005 | Staas et al. | |
| 6,996,614 B2 * | 2/2006 | Hallinan et al. | 709/226 |
| 7,028,102 B1 | 4/2006 | Larsson et al. | |
| 7,032,222 B1 * | 4/2006 | Karp et al. | 718/104 |
| 7,038,796 B1 | 5/2006 | Gupta et al. | |
| 7,038,799 B2 | 5/2006 | Laursen et al. | |
| 7,058,685 B1 | 6/2006 | Van Zee et al. | |
| 7,065,497 B1 | 6/2006 | Brewster et al. | |
| 7,079,276 B2 | 7/2006 | Kimura | |
| 7,190,476 B2 | 3/2007 | Berkema et al. | |
| 7,196,803 B1 | 3/2007 | Simpson et al. | |
| 7,200,748 B2 | 4/2007 | Kim et al. | |
| 7,218,406 B2 | 5/2007 | Al-Kazily et al. | |
| 7,382,473 B2 | 6/2008 | Chohsa et al. | |
| 7,385,718 B2 | 6/2008 | Berkema et al. | |
| 7,424,509 B2 | 9/2008 | Simpson et al. | |
| 7,656,545 B1 | 2/2010 | Simpson et al. | |
| 8,027,049 B2 | 9/2011 | Kinoshita et al. | |
| 8,699,053 B2 | 4/2014 | Hoover et al. | |
| 2001/0029531 A1 * | 10/2001 | Ohta | 709/223 |
| 2002/0129118 A1 | 9/2002 | Cherry | |
| 2002/0191206 A1 | 12/2002 | Anderson et al. | |
| 2002/0194228 A1 | 12/2002 | Reich et al. | |
| 2002/0194307 A1 | 12/2002 | Anderson et al. | |
| 2003/0067624 A1 * | 4/2003 | Anderson et al. | 358/1.15 |
| 2004/0139229 A1 * | 7/2004 | Mickeleit | 709/245 |

FOREIGN PATENT DOCUMENTS

| | | |
|---|---|---|
| EP | 0864964 A2 | 9/1998 |
| EP | 0872792 A2 | 10/1998 |
| EP | 0898410 A2 | 2/1999 |
| EP | 0950969 A2 | 10/1999 |
| EP | 0965908 A2 | 12/1999 |
| EP | 1089543 A1 | 4/2001 |
| JP | 06077994 A | 3/1994 |
| JP | 2001084191 A | 3/2001 |
| WO | WO-0122259 | 3/2001 |

OTHER PUBLICATIONS

International Preliminary Examination Report, issued in PCT Application No. PCT/US2001/048767, May 18, 2006, 3 pages.

International Preliminary Examining Authority, Written Opinion issued in PCT Application No. PCT/US2001/048767, Jan. 27, 2006, 4 pages.

International Search Report issued in PCT Application No. PCT/US2001/048767, Oct. 29, 2002, 3 pages.

Taylor, K. et al., United States Patent Application entitled "Limited Printing of Electronically Transmitted Information," U.S. Appl. No. 09/546,059, filed Apr. 10, 2000.

Behnarn Mehalanpazir, United States Patent Application entitled "Method and System For Printing From an IP Network," U.S. Appl. No. 09/697,990, filed Oct. 27, 2000.

\* cited by examiner

NETWORK BASED SOFTWARE AGENT TO ALLOW DYNAMIC RESOURCE ACCESS

BACKGROUND OF THE INVENTION

1. The Field of the Invention

This invention relates generally to the field of computer networking. In particular, embodiments of the present invention relate to systems and methods for providing network resources to network connected client.

2. The Relevant Technology

Computer and data communications networks continue to proliferate due to declining costs, increasing performance of computer and networking equipment, and increasing demand for communication bandwidth. Communications networks—including wide area networks ("WANs") and local area networks ("LANs")—allow increased productivity and utilization of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has grown to include many different physical configurations. Examples include Ethernet, Token Ring, Fiber Distributed Data Interface ("FDDI"), Fibre Channel, and InfiniBand networks. These and the many other types of networks that have been developed typically utilize different cabling systems, different bandwidths and typically transmit data at different speeds. In addition, each of the different network types have different sets of standards, referred to as protocols, which set forth the rules for accessing the network and for communicating among the resources on the network. Historically, a majority of installed networks utilize a wire-based communications medium. That is, the interconnections between computers and peripherals are accomplished with elaborate wire and cable-based connection systems. Depending on the size and type of network involved, the cost, installation, maintenance and upgrading of such networks is quite complex and requires sophisticated skills. Moreover, even the physical space needed for today's wire-based network systems can be prohibitive.

One solution to some of the drawbacks of wire-based connections is the use of short range wireless communication schemes to interconnect computers and computer peripherals within a network. The use of wireless communications provides a number of advantages, including the elimination of complex, expensive, and inconvenient wire and cable-based connections. A number of wireless communications standards have been developed for such applications; two popular examples are known as IEEE 802.11 and "Bluetooth." Both standards use low power radio frequencies to allow communication between various devices such as mobile phones, laptop and desktop computers, printers, modems, PDAs, and the like.

Bluetooth technology was originally envisioned for the purpose of replacing cabling and other hard-wired connection schemes used to connect auxiliary devices to a desktop or laptop computer. However, in addition to providing those types of capabilities, Bluetooth has further evolved into a method of sending both data and voice signals between a wide range of devices. For example, a Bluetooth-enabled PDA could be configured to automatically connect to a Bluetooth-enabled communications link to an established network within a building, therefore gaining wireless access to computing resources such as printers, Internet portals, etc.

Similarly, 802.11 transceivers provide the ability to create a wireless connection between a computer-device and other 802.11 enabled devices, such as a wireless hub connected to an existing local area network. In this environment, an 802.11 equipped device can exist as a node on a local area network, yet does not require a physical connection to the network. Like Bluetooth, aside from the advantages relating to the elimination of wires and cabling, this wireless attachment scheme allows a user—especially a user of a mobile computing device—to maintain a network connection even while physically moving, for example between offices.

Thus, such wireless schemes provide the ability to connect any one of a number of computing devices to a standard wire-based LAN that would normally require some form of wired connection, such as an Ethernet network interface card (NIC) and cable. Consequently, as this wireless technology becomes more prevalent, it has become increasingly important to seamlessly integrate wireless communication devices with traditional wired-based networks. However, there have been a number of problems in integrating wireless networking within existing wire-based networks.

For example, one obstacle typically encountered when integrating a wireless computing device within an existing, wire-based legacy network relates to the proper software configuration of the device. To operate correctly, each individual computing device within a given network is configured with particular software applications and drivers that allow it to, for example, communicate with other devices, utilize the network resources, etc. Problems arise when the particular computing device is physically transferred between network types—a circumstance that is increasingly common due to the availability of portable computing devices and wireless access schemes. Consequently, the computing device must typically utilize a different set of configurations, applications and/or device drivers for each different network. This is often presents a practical limitation on a user's ability to connect to a new network. For example, if a user with a portable computing device needs to connect to a new network so as to access a printer, the user may first have to download the appropriate drivers and/or applications. This exercise is typically outside of the skill set of most users. Moreover, the portable computing device may not even have the memory or storage space available for the required drivers and applications. Consequently, it is often difficult, if not impossible for all practical purposes, for mobile computers to efficiently utilize the resources of foreign networks.

Therefore, there is a need for a solution to these and other problems associated with the configuration of a computing device for different network environments. In particular, it would be an advancement to provide a solution that makes resources available to a client when it connects to a network. Preferably, the configuration would be substantially automatic and transparent to the user, and occurs in a manner that does not require significant software resources to be downloaded to the computing device client. Such a solution would allow wireless and mobile users, for example, to easily move between networks, and yet have consistent access to the network's resources. Moreover, such an approach would not require any specialized skills or knowledge on the part of the user.

SUMMARY OF PREFERRED EMBODIMENTS

These and other problems in the prior art, namely problems associated with the reconfiguration of computing devices for new network environments, are addressed by embodiments of the present invention. By way of overview, embodiments of the invention pertain to systems and methods that enable a client computing device to be connected to a foreign computer network and in a manner so as to be capable of utilizing network resources within the network. Moreover, this capability is provided even where the client does not possess the various applications and drivers that would otherwise be needed to directly interface with the corresponding network resources, such as a printer. For example, in one exemplary configuration, a personal digital assistant (PDA) wirelessly connects to a foreign Ethernet network via a wireless access point, and is able to print a document without having to first download the specific printer driver, or, in some embodiments, even the specific application that is used to open the document. Moreover, access to the network services are preferably provided in a manner that is substantially transparent to the user of the client device.

In an exemplary embodiment, the present invention is implemented in the form of a dynamic resource locater configured as a software agent. The software agent is stored on a given network, such as a local area network (LAN), so that it can communicate with a computing device that connects to the network via a network access points, such as a wireless access point. When a client computing device establishes a data connection to the network, it is configured so as to "request" a dynamic resource locater agent. The responding dynamic resource locater agent informs the client of any available network resources on the network by, for example, displaying them via a dynamic resource locater interface application executing at the client. The dynamic resource locater interface on the client also preferably provides the client with the ability to request that a particular "task" be performed by the dynamic resource locater agent. The requested task typically involves the services of at least one of the network resources available on the network. For example, in preferred embodiments, a network resource can include network software applications (such as an Internet portal) and/or network hardware devices (such as a printer or a modem) that are hosted by and available via the network.

Thus, if a task requested by the client utilizes an individual available resource, the dynamic resource locater agent functions so as to physically execute the task on behalf of the requesting client. If there are multiple network resources available to perform the task, the dynamic resource locater agent will simply associate with a network resource based upon predetermined criteria. For example, criteria may specify that the locater agent select the resource that is physically closest, or that is not already processing another request, etc.

In addition, depending on the nature of the task requested, the dynamic resource locater agent may request additional information/data from the computing device client. For example, the locater agent may request that the client provide the location of documents pertaining to a requested print operation. In this scenario, a location can be provided via any appropriate manner, such as in the form of an IP address or related unique network address such that the dynamic resource locater can then obtain the document(s) and proceed to execute the task—such as a print. In this scenario, the dynamic resource locater agent will next download or otherwise obtain a copy of any documents pertaining to the task (print operation), and then allocate the proper network based program (e.g., print driver and word processing application) to perform the requested task (e.g., print operation). This allocation is performed by analyzing the task requested and the characteristics of any documents pertaining to the task.

Next, the dynamic resource locater will execute the task utilizing the proper network based program. In preferred embodiments, the dynamic resource locater will inform the client upon completion of the task and the location of any output materials.

Thus, the foregoing solution provides a number of advantages over the prior art. For example, a computing device, such as a wireless enabled portable computer, can be automatically configured to access and utilize resources on a foreign network by merely seeking out the services of a dynamic resource locater agent that is present on the foreign network. The client can then, via the services of this agent, identify and request the services of various network resources, such as printers, modems, databases, software applications and the like. Moreover, the dynamic resource locater provides the corresponding computational resources on behalf of the client. As such, there is no need to download and install device drivers and the like on the client. This greatly simplifies the process for the user of the client device, and also minimizes the computational resources needed for the task on the part of the client.

The foregoing, together with other features and advantages of the present invention, will become more apparent when referred to the following specification, claims and accompanying drawings.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF PREFERRED EMBODIMENTS

Figure 1:
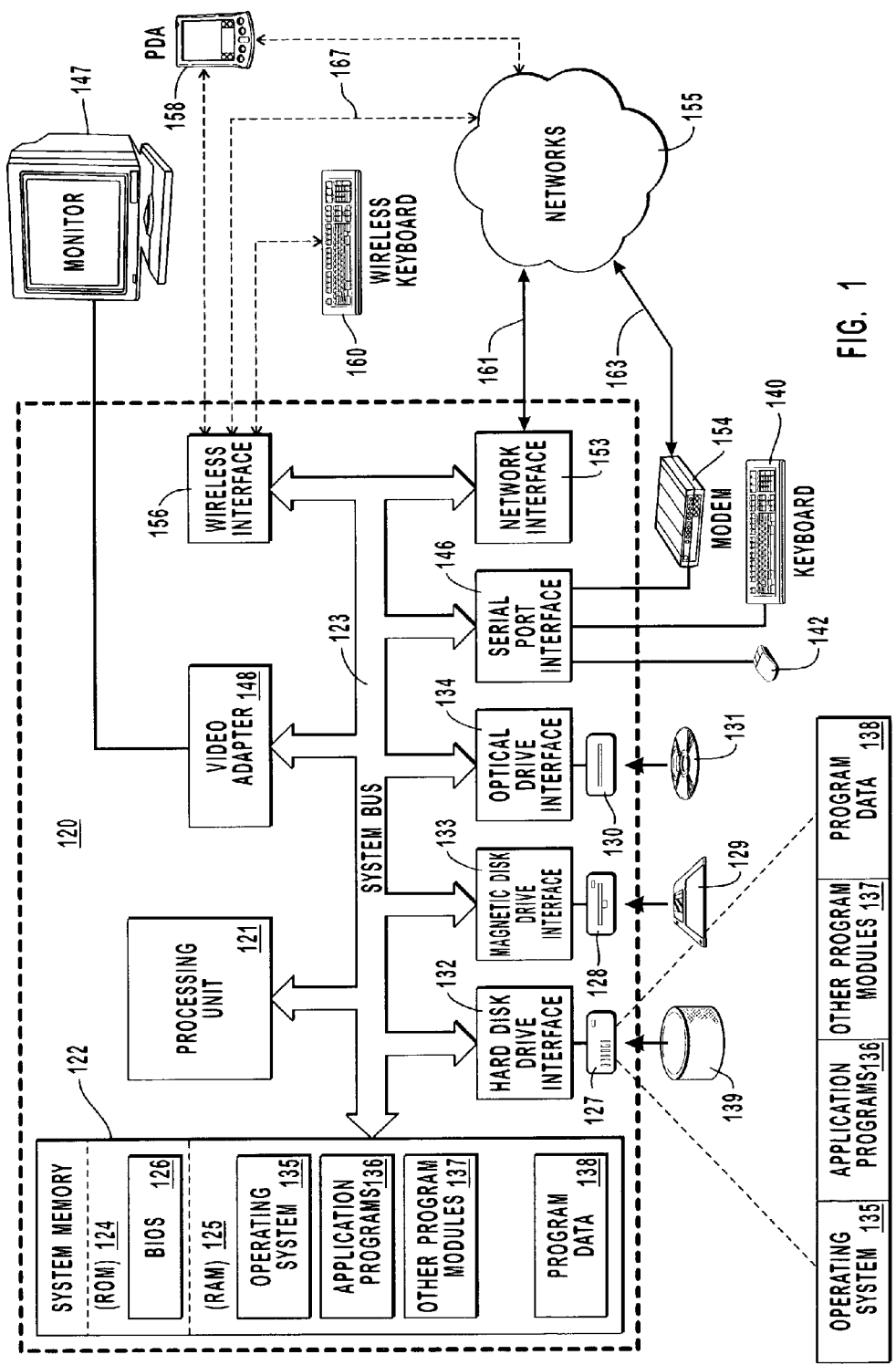
FIG. 1 illustrates an exemplary processing system that provides a suitable operating environment for embodiments of the present invention.

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

In general, the present invention relates to systems and methods that enable a computing device (sometimes referred to as a client), such as a portable computer, to access a network and utilize network resources without the need for downloading drivers or applications pertaining to the relevant network resources. In presently preferred embodiments, a dynamic resource locater agent, preferably implemented via software executing on a programmable device on the network, is configured to accept a "task" from a client. The task is then performed under the control of the dynamic resource locater agent, which utilizes the necessary software application and/or network hardware resources within the network.

Preferred embodiments of the system and method provide a number of advantages not previously available with prior art solutions. In particular, the approach greatly increases the flexibility of a computing device that requires access to, and use of, different network environments and network resources, such as a portable computer having wireless access capabilities that moves from network to network. Embodiments of the invention allow the computer to connect to the network and utilize the network resources available within each network yet does so without the need for complex reconfiguration steps otherwise needed in prior art solutions.

For example, in one implementation scenario, a user with a portable computer having wireless access capabilities may be present within a building, such as a hotel, having a wireless access point to a wire-based local area network. However, the user's computer may not be configured with the appropriate network software and/or device drivers for interacting with resources on this particular foreign network. In the past, if the user desired to access the network and utilize any of the network resources (e.g., printers, facsimiles, modems, etc.), it would first have to be configured with relevant software and drivers. As is well known, this type of configuration process is complex and time consuming, and also takes up computer resources that may not be available. However, if equipped with embodiments of the present invention, the user may access network resources without having to undergo such a configuration process. For example, if the user wants to send a fax via a facsimile machine connected to the network, embodiments of the present invention allows the portable computer device to access the new network and utilize the services of a network resource—here a facsimile machine. Moreover, the service is provided without the need for downloading relevant driver software and/or other configuration steps.

While embodiments of the present invention are described in the context of particular network environments and configurations, such descriptions are for illustration purposes only and should not be viewed as limiting of the invention. Indeed, the capabilities described would find application in a myriad of network environments and network applications.

FIG. 1 and the following discussion are intended to provide a brief, general description of an example of a suitable computing environment in which embodiments of the present invention may be implemented. Although not required, embodiments of the invention may be described in the general context of computer-executable instructions, such as program modules, being executed by computers operating within network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that embodiments of the invention may be practiced in network computing environments with many types of computer system configurations, including personal computers, hand-held devices, mobile telephones, personal digital assistants ("PDAs"), multi-processor systems, microprocessor-based or programmable consumer electronics, network PCs, minicomputers, mainframe computers, and the like. The invention may also be practiced in distributed computing environments where local and remote processing devices are linked (either by hardwired links, wireless links, or by a combination of hardwired or wireless links) through a communications network and both the local and remote processing devices perform tasks.

FIG. 1 illustrates an example system for implementing embodiments of the invention that includes a general-purpose computing device, one example of which is shown in the form of a conventional computer 120. Computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and/or an optical disk drive 130 for reading from or writing to removable optical disk 131 such as a CD-ROM or other optical media. In this particular example, the magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Of course, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 and/or RAM 125. Examples include an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a wireless interface, a parallel port, a game port, a universal serial bus (USB) and the like. A monitor 147 or another display device is also connected to system bus 123 via an interface, such as video adapter 148. In addition to the monitor, some computers may include other peripheral output devices (not shown), such as speakers and printers.

The computer 120 may be operatively connected to a networked environment, an example of which is designated in FIG. 1 as network 155. As is well known, network 155 may be used to connect computer 120 to any one of a number of different network resources, such as other remote computers, which may be personal computers, servers, routers, network PCs, peer devices or other common network nodes, and typically include many or all of the elements described above relative to the computer 120. Such computing devices may also provide a variety of network resources, such as various applications. As is well known, other network resources may be present on the network, such as printers, modems, facsimile machines, other network equipment (switches, hubs, access points, etc.) and the like.

Examples of various logical connections to network 155 are depicted in FIG. 1 include a wireless network 167, a local area network (LAN) 161, and a wide area network (WAN) 163. Each of the logical connections 167, 161, 163 represent a different way for the computer 120 to connect to the network 155. Moreover, actual connection to the corresponding network is facilitated by a network interface device operatively connected to the computer. For example, the wireless network 167 may utilize radio frequencies, microwaves, infrared light, etc. to transmit signals via the wireless interface 156 to the network 155. Connection to the LAN 161 is accomplished via a hard-wired network interface device, such as that represented at network interface 153. The WAN 163 utilizes a modem 154 to decode the signals and a standard telephone line, wireless telephone line, coaxial cable, or fiber optic cable to transmit the signals from the serial port interface 146 to the networks 155. Such networking environments are commonplace in office-wide or enterprise-wide computer networks, intranets and the Internet.

By way of further example, the wireless interface 156 could be implemented as a short range radio transceiver that preferably utilizes low power radio frequencies to transmit information over relatively short distances. For example, the wireless interface could be implemented as a Bluetooth or an 802.11 radio transceiver module. In this way, the wireless interface 156 could be used to wirelessly connect the computer 120 to a wide range of external devices, computing devices, networks, etc. For example, a Bluetooth module may be connected to the computer 120 to allow for a wireless connection between the computer 120 and a PDA 158 similarly equipped with a Bluetooth module. In addition, the wireless interface 156 can connect to devices that typically use other interfaces when communicating with the computer 120. For example, keyboards are typically connected to the computer 120 via the serial port interface 146, but may also be connected with a Bluetooth module. To do so, the wireless interface 156 typically includes a protocol that is capable of emulating a standard interface communication sequence, such as a serial port. For example, in a Bluetooth system, the RFCOMM protocol can be used to create virtual serial ports so that serial devices can be wirelessly connected to the computer 120 via the wireless interface 156 without extensive manipulation of existing software drivers, application software, etc.

For purposes of illustration, wireless transceiver module 156 in FIG. 1 is implemented in accordance with the 802.11 wireless standard. As such, the 802.11 transceiver device 156 is configured with a radio that can transmit and receive signals on a particular frequency band. In addition, the device is typically programmable, and is configured with software to process and route wireless signals. This software is implemented as a protocol stack, which is comprised of functional components that are organized within adjacent layers to form a logical stack. Also, depending on the implementation scheme, certain of the components of the stack reside within the host device (such as computer 120) memory and are executed by the host processor (121 in FIG. 1), and other components of the stack are stored and executed at the 802.11 module itself (e.g., 156 in FIG. 1).

Figure 2:
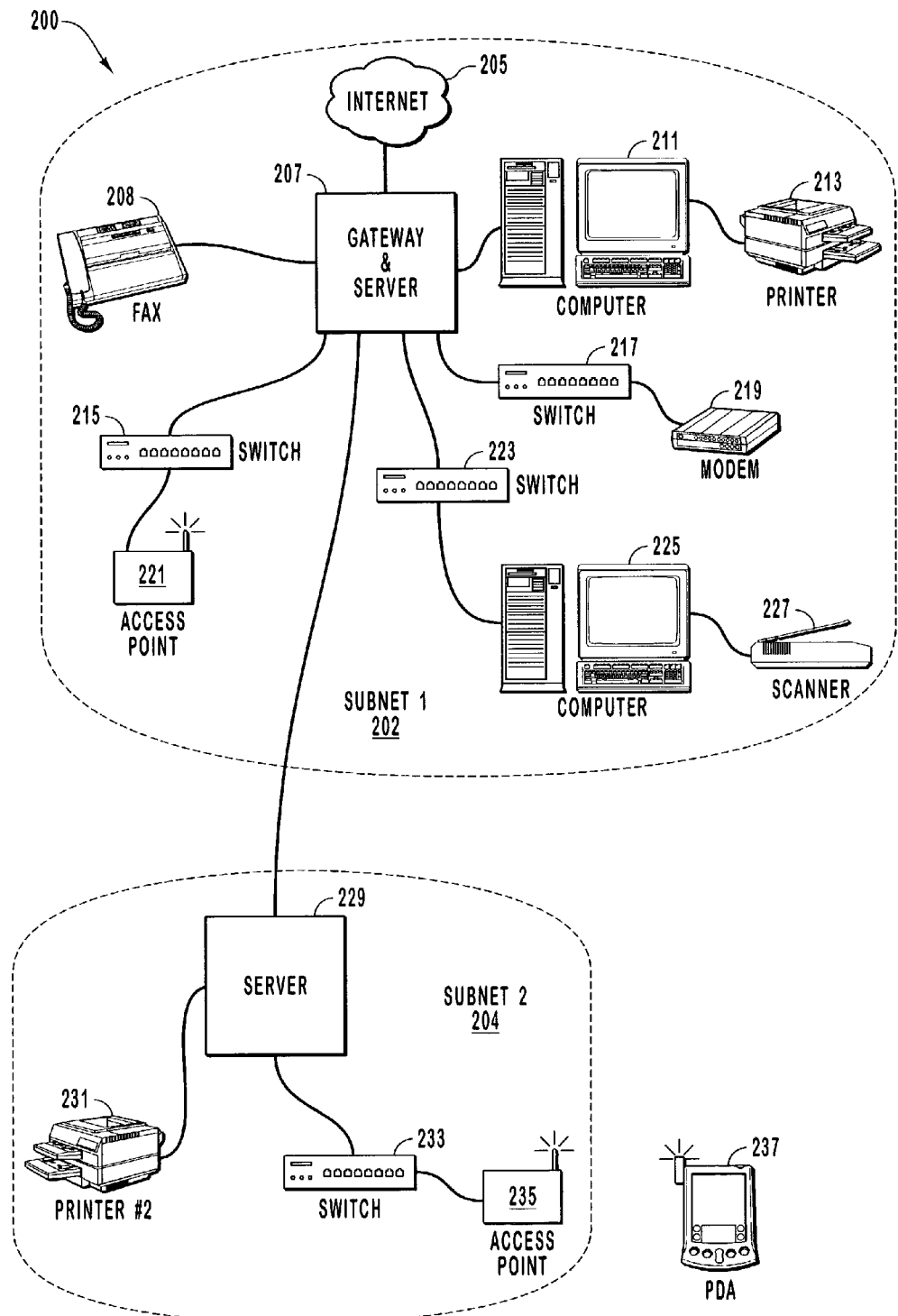
FIG. 2 is a schematic representation of an example of a computer network environment in which presently preferred embodiments of the invention find application.

Reference is next made to FIG. 2 which illustrates a schematic representation of an example of a computer network environment, designated generally at 200, in which can be used embodiments of the present invention. Here, the computer network 200 contains two subnets designated generally at 202 and 204. Here, a subnet is a portion of a network that has a unique IP address and that is controlled by an independent server. Subnet 1 202 is controlled by gateway and server 207 which is also connected to the Internet 205. Subnet 1 202 contains various hardware devices (network resources) that can be used by any appropriately configured computer connected to the network 200. In this particular example, such hardware devices include a FAX machine 208, a scanner 227, a modem 219 and a printer 213. These devices are connected to the gateway and server 207 in different ways to illustrate some of the different network architectures typically present in computer networks. For example, hardware devices can be connected to a server directly if they contain a network interface card or they can be connected indirectly through another device that contains a network interface card. The FAX machine 208 in the computer network 200 illustrates a device connected directly to the server, whereas the modem 219 and the printer 213 illustrate hardware devices connected indirectly to a server.

With continued reference to FIG. 2, subnet 2 204 is controlled by server 229 and contains the hardware device printer #2 231. Both subnets also contain a wireless access point, designated at 221 and 235, that each allow an appropriately configured wireless computing device (such as PDA device 237 in FIG. 2) to connect to the computer network 200 in the same way a computer would connect to a network with a standard wired interface, such as an Ethernet network interface card (NIC) and cable arrangement.

In the network system of FIG. 2, a computing device, such as PDA 237, is able to connect to a wireless access point, such as those designated at 221 and 235, and gain access to and utilize any of the network resources, such as the various hardware devices previously described. Moreover, such access is provided in a manner that does not require the PDA 237 user to download software device drivers pertaining to the individual hardware devices, and thus does not require any associated reconfiguration of the PDA device 237.

In preferred embodiments, this functionality is provided via computer software, partially implemented as a software agent executing on a programmable device on the network, and partially implemented as client software executing on the client device, here the PDA 237. The term "agent" is used herein to refer to a program located on the computer network for the purpose of serving the client. The term "client" is used herein to describe a computer device connected to the network that wishes to utilize one or more of the hardware devices within the network. Thus, in a preferred embodiment, when the client connects to the computer network 200, for example via a wireless connection or a standard wired connection, the client requests the assistance of an agent. This request can be performed automatically by configuring software on the client to send out a specific data packet over the computer network. Upon receiving the request, the agent will inform the client of the available network resources within the network. For example, in FIG. 2 available network resources might include a FAX machine 208, a printer 213, a modem 219, a scanner 227, and a printer #2 231. In a preferred embodiment, this information is displayed via a suitable interface provided via the client application at the PDA 237.

Depending on the needs of the user, the services of a particular network resource may be requested via the client software via a task request, which is forwarded to the agent so as to invoke the services of the resource. For example, a task could be to print or fax a document that is located on the client computing device (here, the PDA 237). The particular methodology used in one presently preferred embodiment for this process of requesting and performing a task will be described in more detail below with reference to FIGS. 4 and 5.

Figure 3:
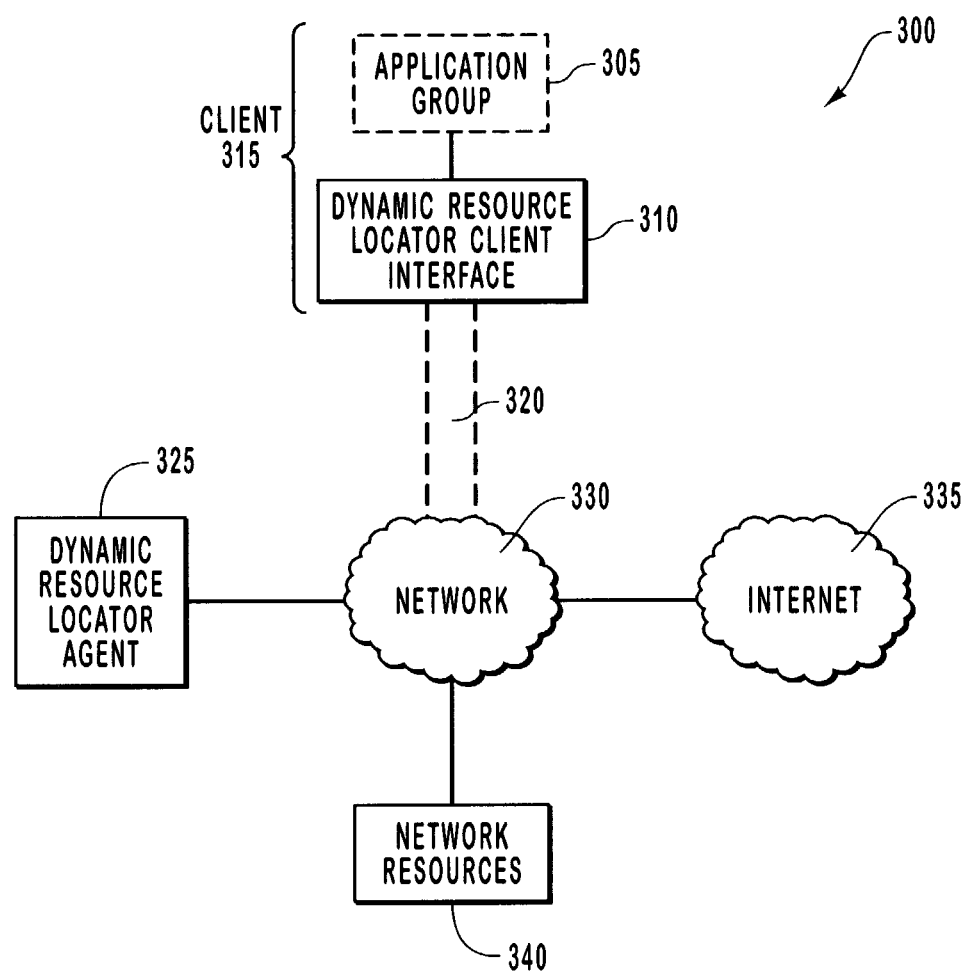
FIG. 3 illustrates a functional block diagram illustrating the functional implementation of one presently preferred embodiment of a network environment with an example of a dynamic resource locater agent in relation to a client and the network.

Reference is next made to FIG. 3, which illustrates a simplified functional block diagram of a network environment, designated generally at 300, showing the location of one embodiment of an agent, referred to as a "dynamic resource locater agent," designated at 325 in relation to a client, designated at 315. Here, the client 315 is illustrated as preferably comprising an application group 305 and a dynamic resource locater client interface (DRLCI) 310. The application group 305 represents one or more high level applications that originate tasks that require the use of a network resource. For example, a word processor application might originate a task to print a particular document on a printer that is available on the network 300 as a resource. However, it should be noted that an application may not necessarily be physically located at the client device. Indeed, the application itself could be a network resource. For example, an application could be executed on the Internet 335 such that it appears to the user of the client 315 that it is being executed at the client 315.

In the illustrated embodiment, the DRLCI 310 is implemented as a client interface to the dynamic resource locater agent 325 located within the computer network. In particular, the DRLCI 310 preferably provides the functional interface with the dynamic resource locater agent 325 in a manner such that applications within the application group 305 do not necessarily need to be aware of which network resource/hardware device will perform a task, or even that the network resource is remotely connected via a network.

As is also shown in FIG. 3, the client 315 is connected to a computer network 330 via some form of network interface 320. By way of example and not limitation, network interfaces can include wireless and wired network interface arrangements such as those commonly used for 802.11, Bluetooth and Ethernet networks and the like. In the illustrated embodiment, the dynamic resource locater agent 325 communicates directly with the DRLCI 310 to provide the application group 305 with access to various resources 340 within the network. This dynamic access is accomplished by allocating appropriate network based programs or device drivers needed to perform the particular tasks requested by an application.

For example, if a word processor in the application group 305 requests that a particular document be printed, the task request is made via the DRLCI 310, and the dynamic resource locater agent 325 could route the document to the appropriate device driver to utilize a printer network resource for printing the document. The dynamic resource locater agent 325 can also execute tasks requiring the use of documents located at specific locations on the Internet 335 rather than on the client or the network.

Figure 4:
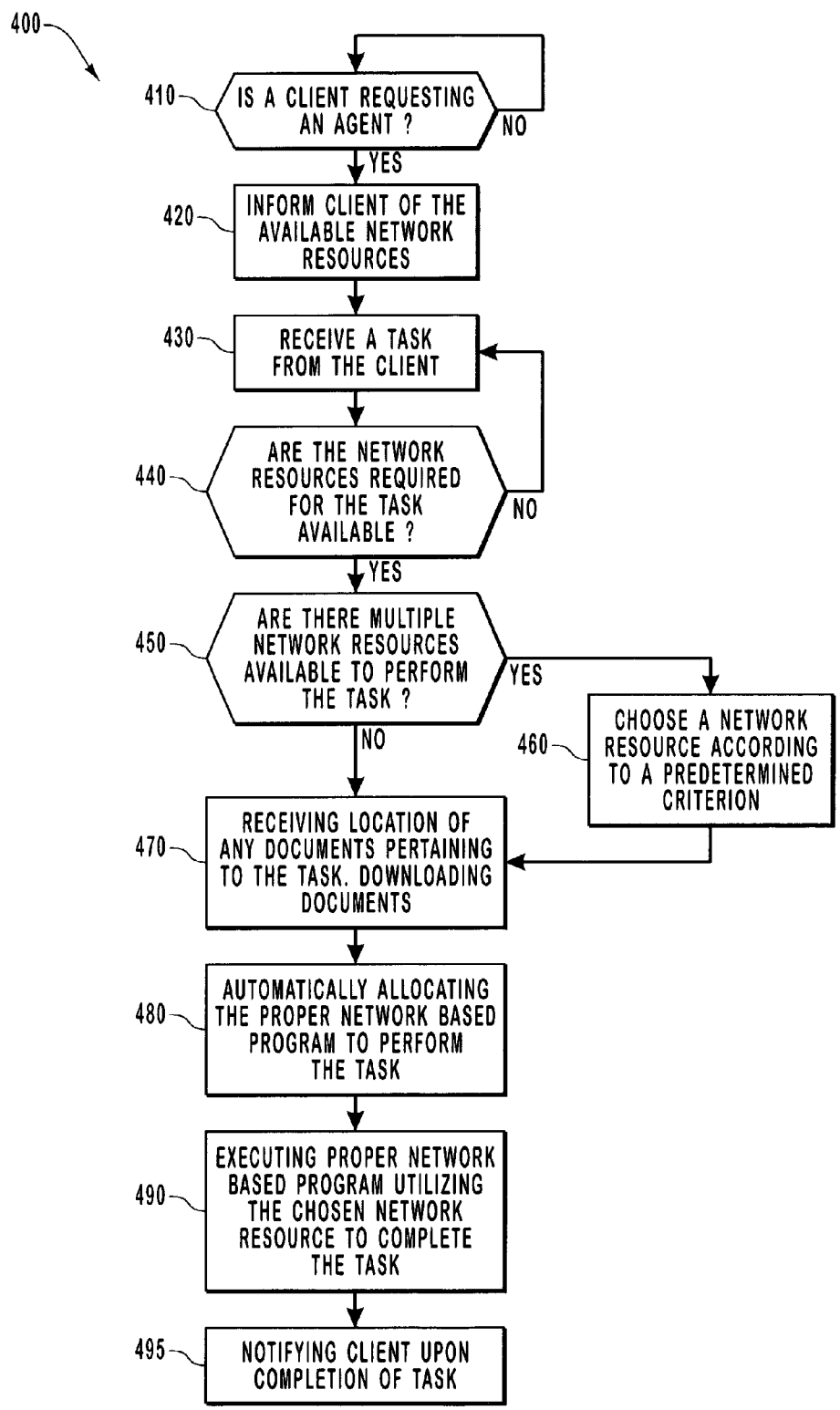
FIG. 4 is a flow chart illustrating a presently preferred embodiment of the process steps for implementing the dynamic resource locater agent that provides a client with the ability to utilize various network resources without downloading additional applications and/or drivers.

Reference is next made to FIG. 4, which is a flow chart, designated generally at 400, illustrating one presently preferred embodiment of the logical steps used to implement the functionality of the dynamic resource locater agent 325 of FIG. 3. Again, in a preferred embodiment, these steps are implemented via executable program steps that execute on an appropriate programmable device on the network. The programmable device can be an appropriate computing device, such as described in FIG. 1, and can be implemented via a network computer, an wireless access point, a network switch, etc. The dynamic resource locater agent initially monitors the network to determine if a new client is requesting the assistance of an agent 410. This monitoring can be done, for example, by monitoring the receipt of data packets traveling within the computer network to see if they match a predetermined agent request notification. If a client does request an agent, the dynamic resource locater agent will contact the client and inform it of the available resources within the network, as is shown at program step 420. This information can be actually displayed at the client via the client interface program (such as the DRLCI 310 illustrated in FIG. 3) executing at the located on the client, and/or merely stored in a memory location at the client. The agent will then await receipt of a task request from the client requiring the use of at least one of the network resources within the network, as is represented at program step 430. This task could originate, for example, via a request from an application executing at the client (e.g., a word processor requesting a print operation). Alternatively, a task request could originate from an application that is actually executed at another network location, such as an application executing at the Internet. At program step 440, once the task request is received, the dynamic resource locater agent will then determine if there is at least one network resource on the network available to perform the task 440. If not, the agent will preferably inform the client that there are no network resources available to perform the requested task and simply revert back to awaiting receipt of the next task at step 430.

If at step 440 it is determined that there is a network resource available, the agent will proceed to program step 450 to determine whether there are multiple network resources available to perform the task. If there are multiple network resources available, the dynamic locater agent will choose a network resource based upon a predetermined criterion, as represented at program step 460. The basis upon which a resource is selected could include any one of a number of criteria, including physical proximity, the speed of a network resource, available network bandwidth, etc.

Once the appropriate resource is identified, the dynamic resource locater agent proceeds to program step 470 where it will receive the location of any document(s) pertaining to the requested task, and then download the document(s) 470. Here, the term "document" is meant to convey the particular object for which the resource is being utilized. Of course, depending on the task requested and the resource involved, the object may not actually be a document. For purposes of example, the document(s) here may be an actual document that is being printed, faxed, etc. The document(s) may be actually physically stored at the client device, elsewhere on the network, or even on the Internet. Thus, if a document is located on the Internet, a location would preferably include a specific IP address. Alternatively, the location of the document may be identified via any other appropriate address identifier. Alternatively, a browsing function could be incorporated into the client to find and select the document rather than entering a location.

Processing then continues at program step 480, where the dynamic resource locater agent will automatically allocate the proper network based program to perform the requested task. For example, if the task is to print a particular document, the dynamic resource locater agent would automatically allocate a device driver corresponding to a printer that is capable of printing the document. If the task is to simply view a particular document, the dynamic resource locater agent will automatically allocate an application that is capable of displaying the particular document. The allocation of the proper network based program is performed by initially analyzing the task o determine what type of network based program is appropriate for that task. Secondly, the characteristics of any documents (or similar object) necessary to complete the task are analyzed to determine if they require a specific program to be understood. For example, if the task is to print a particular Microsoft Word document on a printer, it can be determined that Microsoft Word or an appropriate viewer must be used to perform the requested task. The dynamic resource locater agent will then execute the network based program utilizing the chosen network resource to complete the task, as is indicated at program step 490. Preferably, the dynamic resource locater agent will notify the client upon completion of the task, as is indicated at program step 495.

Figure 5:
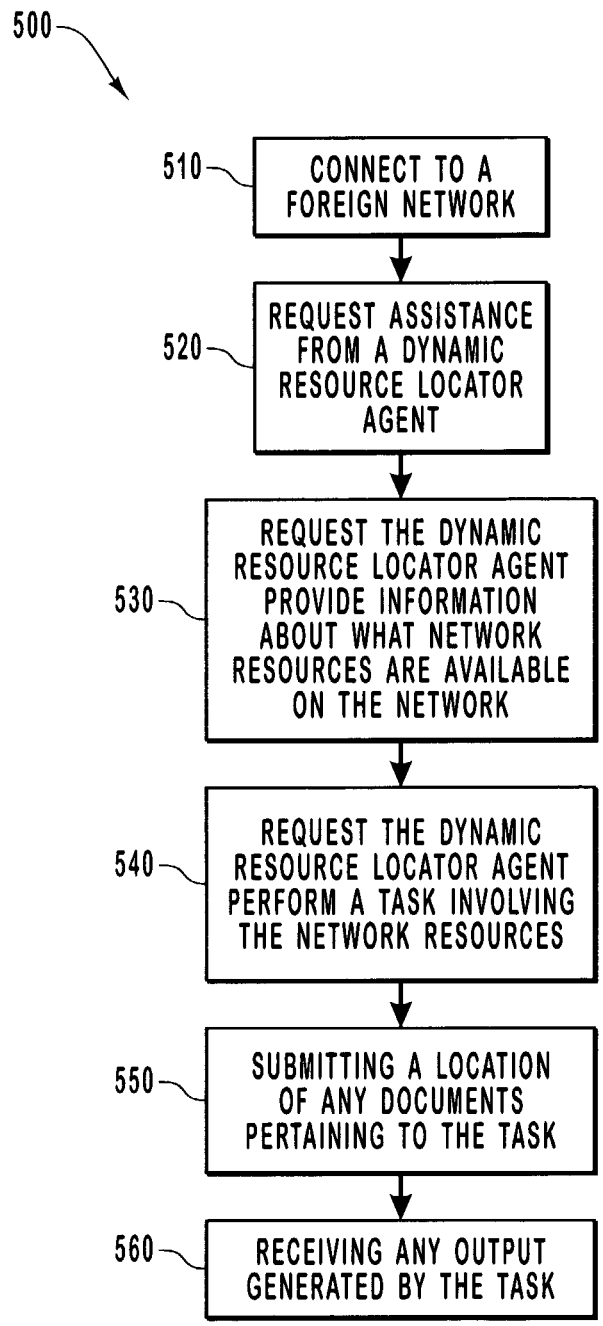
FIG. 5 is a flow chart illustrating one presently preferred embodiment of the process steps followed executed at a client for interacting with a dynamic resource locater agent process of the sort illustrated in FIG. 4.

Reference is next made to FIG. 5, which illustrates a flow chart, designated generally at 500, showing one presently preferred embodiment of the program steps that can be used to implement the client application, including the DRLCI function 310 in FIG. 3. Again, the client application is preferably implemented via software comprised of executable instructions that are capable of execution on a suitable programmable device at the client host, illustrated in FIG. 2 as a PDA device. Again, the programmable device used to execute the instructions could be that of the host itself (e.g., such as the processing unit 121 of the PDA, computer, etc.), or by a processor present on the corresponding network interface device (such as 153 or 156 in FIG. 1).

Beginning at program step 510, the client first initiates a connection to a foreign network. Again, depending on the implementation, the connection can be made over any suitable network interface device to any corresponding network type. Moreover, the network interface can connect via a wired connection, or via a wireless connection such as 802.11, or Bluetooth. Once a connection is established, at program step 520 the client requests the assistance of a dynamic resource locater agent present on the network. This request can be made by sending out into the network a particular broadcast data packet configured to be received by a node that is executing the dynamic resource locater agent software function. Once a locater agent responds to the request, at program step 530 the client can request that the agent provide information about what network resources are available on the network.

Depending on the nature of the resources that are available, the client can then subsequently request that an appropriate "task" be performed by the agent on behalf of the client, as is indicated at program step 540. The specific request could be at the behest of an application executing at the client device (e.g., a word processing application, Internet browser, spreadsheet application, etc.), or could be made directly by the user via an interface provided by the client DRLC function. Again, the specific process followed may also vary depending on the nature of the task requested. For example, in the illustrated process where the task involves a document/file (printing, faxing, etc.), the client will submit the location of a document involved in the task, as designated at program step 550. Again, the physical storage location of the document could be at client device itself (which, in the example is a PDA device), another storage location on the network, or even on a remote network location such as the Internet. Also, as is indicated at program step 560 and again depending on the nature of the task requested/performed, the client may receive some output from the agent at the completion of the task. For example, the agent may supply to the client an indication that the requested task has been completed, the location of a printer for a print operation, or any other appropriate output for the given task.

In summary, the present invention provides a number of benefits and advantages over the prior art. In particular, it allows a computing device to easily access network resources in a manner that does not require complex device reconfiguration and setup operations. Instead, the computing device is able to can request the services of particular network resources via a software agent present on the network. The software agent then acts as a proxy on behalf of the client in a manner that such that the services of a network resource are provided to the client. Moreover, access to the services are preferably provided transparently; to the user of the device, network devices appear as if they are connected directly to the client computing device. Thus, a user can connect to the foreign network and have immediate access to the resources of the network.

It will be evident that there are numerous embodiments of the present invention, which, while not specifically described above, are clearly within the scope and spirit of the invention. Consequently, the above description is considered to be exemplary only, and the full scope of the invention is to be determined solely by the appended claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for accessing network resources on a network using a dynamic resource locator agent, comprising:
    establishing a data connection between a dynamic resource locator agent executing on a programmable device on the network and a client;
    receiving, at the dynamic resource locator agent, a location of a document and a requested task associated with the document from the client during the established data connection, wherein the programmable device is distinct from client;
    selecting, by the dynamic resource locator agent, at least one available network resource from a plurality of available network resources to process the document;
    allocating, from the network, at least one device driver from a plurality of device drivers configured to enable the selected network resource to process the document on behalf of the client according to the requested task associated with the document; and
    executing the at least one device driver at a network connected device separate from the client in a manner such that the document is processed according to the requested task associated with the document by the selected network resource on behalf of the client.

2. The method according to claim 1, wherein the location of the document is in the client device, and further comprising:
    downloading the document from the location in the client.

3. The method according to claim 1, wherein the location of the document is a network location, and further comprising:
    downloading the document from the network location.

4. The method according to claim 1, further comprising:
    informing the client of the at least one available network resource.

5. The method according to claim 1, further comprising:
 notifying the client upon completion of the requested task by the network resource.

6. The method according to claim 1, wherein the client is connected to the network via a wireless connection.

7. The method according to claim 1, wherein the client is connected to the network via a wire-based connection.

8. The method according to claim 1, wherein the client comprises a portable computing device.

9. The method according to claim 1, wherein the network resource is a hardware device operably connected to the network.

10. The method according to claim 1, wherein if there are a plurality of available network resources available to perform the requested task, the method further comprises the step of selecting one of the plurality of available network resources based upon at least one predetermined selection criterion.

* * * * *